Aug. 31, 1965 R. A. ROSENTHAL 3,203,701

AUTOMATIC RECORD CLEANING MECHANISM

Filed June 26, 1963 2 Sheets-Sheet 1

INVENTOR.
RICHARD A. ROSENTHAL

BY Kenneth E. Jorman

Aug. 31, 1965 R. A. ROSENTHAL 3,203,701

AUTOMATIC RECORD CLEANING MECHANISM

Filed June 26, 1963 2 Sheets-Sheet 2

INVENTOR.
RICHARD A. ROSENTHAL
BY
Kenneth E. Forman

United States Patent Office 3,203,701
Patented Aug. 31, 1965

3,203,701
AUTOMATIC RECORD CLEANING MECHANISM
Richard A. Rosenthal, New Brunswick, N.J.
(164 Charter Circle, Ossining, N.Y.)
Filed June 26, 1963, Ser. No. 290,678
5 Claims. (Cl. 274—47)

This invention relates to record cleaning mechanisms and more particularly to mechanisms for removing dust from the surface of records while they are being played, such mechanisms being adapted for use with record players of the type that change records automatically.

Various types of dust removing devices are available for automatic record players at the present time. Some consist of a soft brush while others comprise a stiff bristle brush and a soft pad. However, most attach to the player's tone arm in some way. Brushes that clamp directly to the arm may lighten the stylus pressure, while more elaborate mechanisms may increase this force, both having an adverse affect on fidelity, record life, etc. Mechanisms with stiff brushes track the record at their own rate and may exert horizontal or transverse forces on the tone arm, adversely affecting stereo fidelity or causing the stylus to skip a groove and damage the record. Veyr soft brushes, on the other hand, which act upon the tone arm with minimal forces also have minimal effectiveness in removing dust and static causing particles from the record.

Accordingly, it is an object of the present invention to provide a mechanism for effectively removing the dust from records while they are being played on automatic record playing mechanisms which does not affect the force with which the stylus presses down upon the record.

Another object of the present invention is to provide a mechanism for effectively removing the dust from records while they are being played on automatic record playing mechanisms without causing transverse reactions which may affect stereo fidelity or cause the tone arm to skip a groove.

Still another object of the present invention is to provide a mechanism for effectively removing the dust from records while they are being played on automatic record playing mechanisms which operates completely independently of the tone arm while the stylus is in contact with the record, but is operatively connected to the tone arm and automatic record changing mechanism while the latter is in operation.

A further object of the present invention is to provide a mechanism for effectively removing the dust from records while they are being played on automatic record playing mechanisms which is balanced so that the cleaning apparatus contacts the record with sufficient pressure to effectively clean it, but lightly enough so that it cannot damage or cause excessive wear to the record, or affect fidelity by slowing up the turntable.

A still further object of the present invention is to provide a mechanism for effectively removing the dust from records while they are being played on automatic record playing mechanisms which is readily attached to and operated with existing record playing mechanisms by persons unskilled in the art without special tools or techniques.

A final object of the present invention is to provide a mechanism for effectively removing the dust from records while they are being played on automatic record playing mechanisms which, while satisfying the aforementioned objects, is easily and inexpensively manufactured.

These objects and related advantages are attained in an improved mechanism for removing dust from records while they are being played on automatic record playing mechanisms which is comprised of a dusting assembly of one or more brushes mounted on a special arm which is attached by a suitable pivot arrangement to the base of the record player and which is operatively connected to the tone arm and changing mechanism only when the latter is engaged in changing a record, but otherwise may ride upon the record independently of the tone arm. The operative connection is accomplished by a novel engagement arrangement which operates when the automatic changing mechanism actuates. When the changing mechanism lifts the tone arm off the record after the record has been played and moves it to the side to allow the next record to drop, it lifts and moves aside the dusting arm too. When the tone arm is placed upon the next record by the changing mechanism, the dusting arm is so placed also, and the engagement arrangement disconnects the two arms, allowing them to track the record independently, precluding the possibility that the dusting mechanism can adversely affect the tone arm in any way while the record is being played.

The novel features of the present invention, as well as additional objects and advantages thereof will be more fully understood from the following description of the invention, explanation of its operation and drawings in which.

Figure 1:
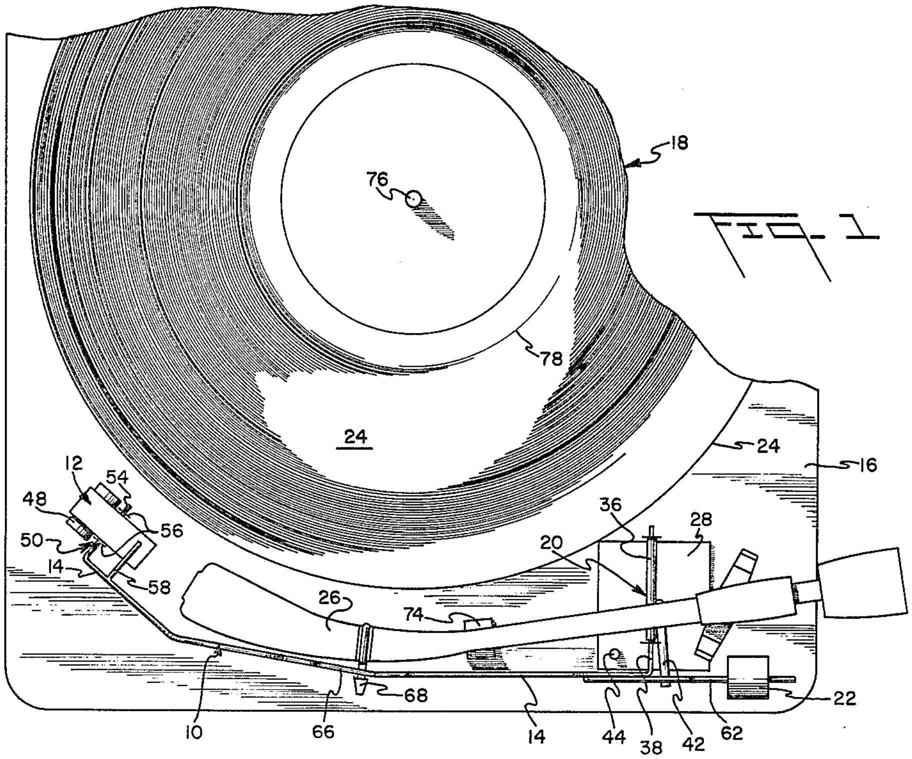
FIG. 1 is a plan view of the dust removing mechanism mounted on an automatic record playing device showing the tone arm and dusting arm in the rest or off position.

Referring now to FIGS. 1 through 6, and more particularly to FIG. 1, there is shown a record dust removing mechanism 10 comprising a dusting assembly 12, attached to a dusting arm 14 which is mounted on the base 16 of an automatic record playing mechanism 18 by means of a double pivot arrangement 20. Also attached at the rear of the dusting arm 14 is a counterweight 22.

In order that the dust removing mechanism 10 be able to clean the record 24 while it is being played, and also follow the movements of the tone arm 26 while the two are operatively connected, it is necessary that the dusting arm 14 be able to describe two distinct movements. The first is an arc in a plane parallel to the surface of the record 24, described when the record 24 is being cleaned, and the second is an arc in a plane perpendicular to the surface of the record 24 described when the automatic changing mechanism (not shown) actuates, lifting the tone arm 26 off the record 24 and lifting the dusting arm 14 also. In order that the dusting arm 14 be able to describe these movements, it is mounted on the base 16 of the automatic record playing mechanism 18 by means of the double pivot arrangement 20.

Figure 2:
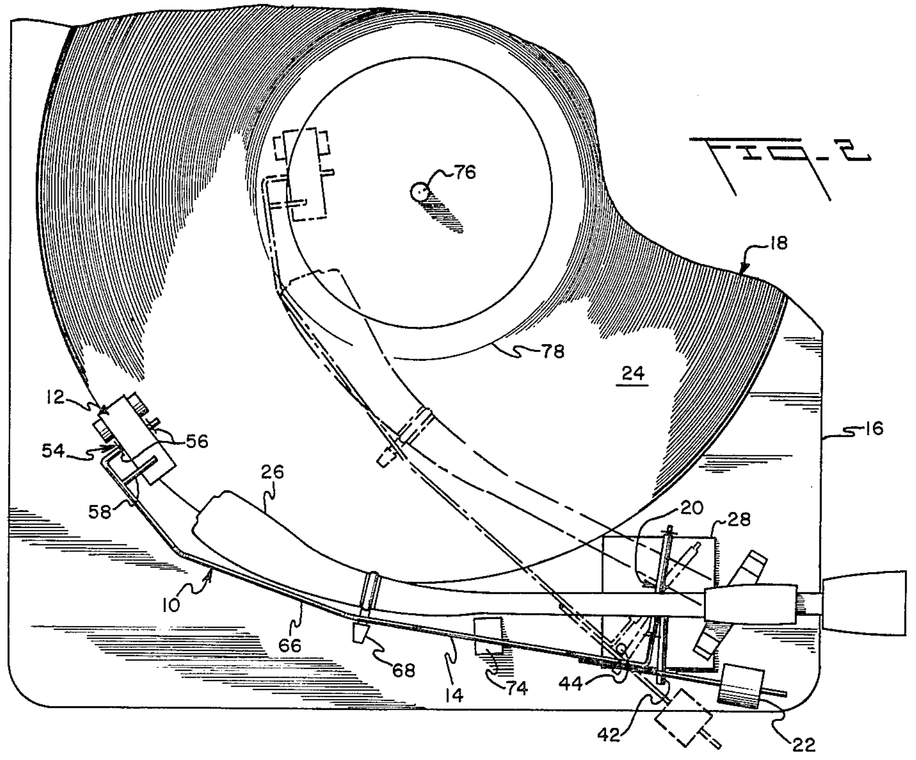
FIG. 2 is a plan view of the dust removing mechanism mounted on an automatic record playing device illustrating the tone arm and dusting arm in operating positions, just after the automatic changing mechanism has completed its operating cycle and, in phantom, just before the automatic changing mechanism begins its cycle.
Figure 6:
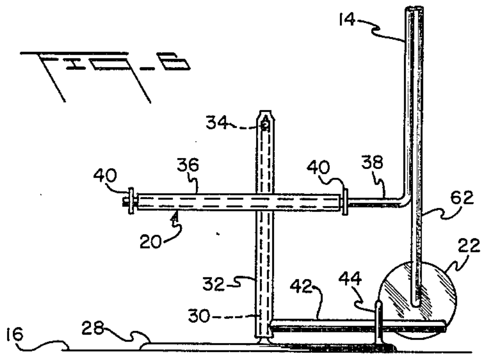
FIG. 6 is a detail view of the double pivot arrangement by which the dusting arm is mounted to the record player, taken along the line 6—6 in FIG. 3.

Referring now to FIG. 6, the double pivot arrangement 20 may comprise a base or foot 28 which is attached by a suitable means to the base 16 of the record playing mechanism 18, substantially in the position shown in FIGS. 1 and 2. Rising perpendicularly from the foot 28 is a rod 30 which is securely attached, for example by soldering, to the foot 28. A vertical tube 32 fits closely around the rod 30. The top of the tube 32 is closed off by, for example pinching, and a small ball bearing 34 is trapped between the closed end of the tube 32 and the top of the rod 30 in such a way that the weight of the tube 32 and the assemblies attached to it are transmitted to the rod 30 by way of bearing 34. The diameter of the tube 32 is such that it may rotate freely but with little play around the rod 30. Attached perpendicularly and securely by, for example, soldering, to the vertical tube 32 is a horizontal tube 36. Rotating freely in this horizontal tube 36 is a horizontal arm 38 which is an extension of the dusting arm 14. The horizontal arm 38 is retained in the tube 36 by, for example, soldered washers 40. Also attached firmly by, for example, soldering, to the vertical tube 32 is a stop arm 42, which contacts a stop 44 attached to the foot 28 for reasons to be hereinafter described. It will now be understood that by means of the double pivot 20, the auxiliary arm 14 may swing through arcs either in a plane parallel to the surface of the record 24, or perpendicular thereto.

Figure 3:
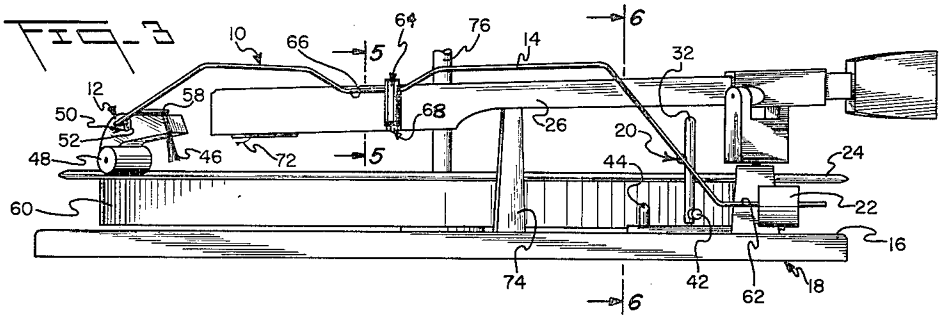
FIG. 3 is a side elevation of the tone arm and dust removing mechanism illustrated in FIG. 1.

In order to effectively remove dust from the surface of the record 24, the dusting assembly 12 utilizes two brushes, one being a stiff bristle brush 46 and the other being a soft brush or pad 48 as shown in FIG. 3. The former dislodges dirt and other objectionable particles from the record 24, and causes the dusting arm 14 to track the record, while the latter collects surface dust in its bristles.

Figure 4:
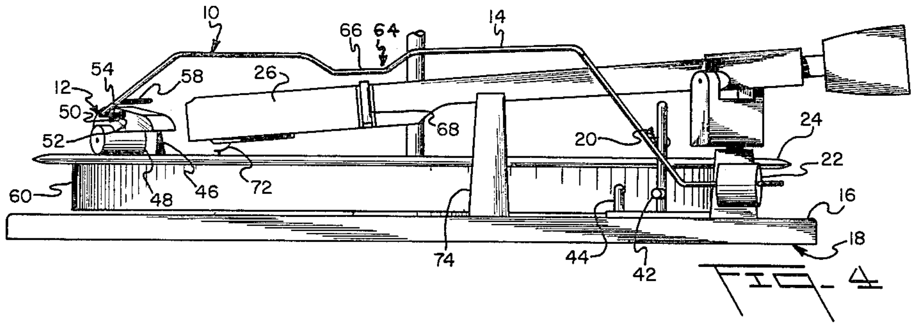
FIG. 4 is a side elevation of the tone arm and dust removing mechanism illustrated in FIG. 2, but omitting the phantom view.

Both brushes, 46 and 48, must contact the record with approximately equal forces when the dust removing mechanism 10 is operating as shown in FIG. 4. This equality of forces must be maintained when the record 24 is uneven or warped, and whether it is the top or bottom record of a stack. Also, the brushes 46 and 48 must be readily accessible for cleaning.

These requirements are met by attaching the dusting assembly 12 to the dusting arm 14 by means of a pivot arrangement 50, as shown in FIGS. 3 and 4, which allows it to rotate in a vertical plane. This pivot arrangement may comprise, for example, an opening 52 through the assembly 12, and an extension 54 of the dusting arm 14 which passes through opening 52. The assembly 12 is secured to the extension 54 by, for example, two soldered washers 56. It will now be understood that the assembly 12 may rotate in a vertical plane about the extension 54 of the dusting arm 14. The center of gravity of the assembly 12 is slightly forward of the opening 52, and thus the assembly 12 tends to tilt forward, but is arrested in this movement by a stop 58 which is securely attached by, for example, soldering, to the dusting arm 14. The assembly 12 thus comes to rest in the position shown in FIG. 3. When the mechanism is operating as shown in FIG. 4, the weight of the dusting arm 14 causes the assembly 12 to assume the position shown in FIG. 2. It will now be understood that the pivot arrangement 50 allows the brushes 46 and 48 to "ride" upon the record 24 and allows the dusting assembly 12 to be rotated upward so the brushes 46 and 48 may be cleaned or moistened with antistatic fluid, thus satisfying the requirements previously set forth herein.

While the pivot arrangement 50 insures that both brushes 46 and 48 contact the record with nearly equal forces, it is also necessary that the magnitude of these forces be sufficient to clean the record 24 effectively and to cause the stiff bristle brush 46 to track the spiral groove in the record, but not so great as to damage the record or affect fidelity by slowing down the turntable 60, or cause objectionable noise. This is accomplished by attaching a counterweight 22 to the rear of the dusting arm 14 by means of a counterweight arm 62. Referring to FIG. 1, it is shown that the counterweight arm 62 is attached securely by, for example, soldering, to the dusting arm 14, and that the counterweight 22 is attached to it. It will now be seen that the counterweight 22 balances the dust removing mechanism 10 about its pivot point in the vertical plane, i.e. the horizontal arm 38, partially counteracting the weight of the dusting arm 14 and the dusting assembly 12 and reducing the cleaning force to the desired magnitude.

Figure 5:
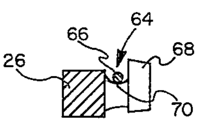
FIG. 5 is a sectional view of the arrangement by which the tone arm engages the dusting arm, taken along the line 5—5 in FIG. 3.

In order that the dusting arm 14 be operatively connected to the tone arm 26 while the automatic changing mechanism is in operation, an engagement arrangement 64 is incorporated into the dusting arm 14, as shown in FIG. 3. Referring to the detail in FIG. 5, this engagement arrangement 64 may consist of a portion 66 of the dusting arm 14 which will engage with a suitable protrusion of the tone arm 26 of the automatic record playing mechanism 18, such as the protrusion 68 in which is incorporated a U-shaped receiver 70 shown in FIG. 5. The protrusion 68 was provided on the arm 26 for the purpose of lifting the arm 26 off the record 24 by hand, but it is used here by the dust removing mechanism 10 to simplify the design of the engagement arrangement 64. If a protrusion such as the protrusion 68 was not provided on the tone arm 26, then the engagement arrangement 64 might take the form of a protrusion from the dusting arm 14 which would extend outward over the tone arm 26 in such a way as to be engaged by the tone arm 26 when the automatic changing mechanism operated. It will now be understood that when the record 24 is playing, and the tone arm 26 is in the operating position shown in FIG. 4 with the stylus 72 resting upon the record 24, the engagement arrangement 64 does not come into contact with the potrusion 68 of the tone arm 26. When the tone arm 26 lifts off the record 24 under the action of the automatic changing mechanism, the protrusion 68 engages the engagement arrangement 64 in the U-shaped receiver 70, as shown in FIG. 5, operatively connecting the dusting arm 14 to the tone arm 26. Other methods and means of operatively connecting the dusting arm 14 to the tone arm 26 and the automatic changing mechanism will be evident to those skilled in the art.

The operation of the dust removing mechanism 10 in accordance with the present invention will now be explained. With the automatic record playing mechanism 18 in the rest or off position shown in FIGS. 1 and 3, a record 24 is placed upon the mechanism in such a position that it drops down onto the turntable 60 when the automatic record playing mechanism 18 is turned on. The turntable 60 begins to rotate, and the tone arm 26 is raised upward off its rest stop 74 by the automatic changing mechanism. The dusting arm 14 is carried along with the tone arm 24 because the engagement arrangement 64 is engaged with the protrusion 68 of the tone arm 26 as shown in FIG. 5. The dusting arm 14 may follow the tone arm 24 in this upward motion because of the action of the double pivot arrangement 20. The tone arm 26 then moves across in a horizontal arc to a point just above the edge of the record 24, carrying the dusting arm with it for the same reasons as those elucidated above. It then drops downward toward the surface of the record 24, but before the stylus 72 contacts the record 24, the stiff bristle brush 46 and soft pad 48 do so and the dusting arm 14 assumes the position shown in FIGS. 2 and 4. The dusting arm 14 has been able to follow all the motions of the tone arm 26 because of the action of the double pivot arrangement 20. The tone arm 26 continues its downward motion, disengaging the engagement arrangement 64 from the protrusion 68 and finally assuming the position shown in FIGS. 2 and 4 when the stylus 72 touches the surface of the record 24. It will be evident that the present invention, with slightly different types of engagement arrangements, can be used with almost all modern automatic record players.

The tone arm 26 now tracks the record 24 under the action of the stylus 72, gradually working its way toward the dashed position in FIG. 2. The dusting arm 14 also tracks the record 24 under the action of the stiff bristle brush 46. Because the dusting arm 14 is of substantially the same length as the tone arm 24, and because its pivot point is somewhat nearer the center 76 of the turntable 60 than is the pivot point of the tone arm 26, the configuration of forces on the stiff bristle brush 46 will be such as to draw the dusting arm 14 toward the center 76 of the record 24, causing the dusting arm 14 to track the record slightly faster than the tone arm 26. The effect of these forces becomes more pronounced as the dusting arm 14 gets closer to the center 76 of the turntable 60 and when the stiff brush 46 finally runs off the spiral groove onto the run out portion 78 of the record 24, it will be drawn rapidly toward the center 76 of the turntable 60 and will come to a stop in the position shown in the dashed portion of FIG. 2 when the stop arm 42 of the double pivot arrangement 20 strikes the stop 44. The stop 44 is carefully placed so that the dashed position of the dusting arm 14 shown in FIG. 2 will be such that the engagement arrangement 64 on the dusting arm 14 is as near as possible to directly above the U-shaped receiver 70 of the protrusion 68 of the tone arm 26 when the stylus 72 has run off the spiral groove on to the run out portion 78 of the record 24 and the tone arm 26 has assumed the dashed position of FIG. 2 which is its position when the automatic changing mechanism of the automatic record playing mechanism 18 actuates. The tone arm 26 will now be lifted off the record 24 and the U-shaped receiver 70 will engage the engagement arrangement 64 so that the continued motion of the tone am 26 upward and finally outward away from the center 76 past the edge of the record 24 will carry the dusting arm 16 outward too, whence, if another record is present the process will begin again or, if not, the tone arm 26 and dusting arm 14 will return to the rest position shown in FIGS. 1 and 3 and the automatic changing mechanism will turn the automatic record playing mechanism 18 off.

From the foregoing description, it will be apparent that I have provided a record cleaning mechanism for operation with automatic record players which in no way affects the behavior or operation of the tone arm while the record is being played. While I have illustrated and described one particular form of the record cleaning mechanism, it will be evident to those skilled in the art that various changes may be made to this form and that other forms are possible, all within the spirit of the present invention. For example, depending on the configuration of the record player's tone arm, the engagement arrangement 64 may take other forms or may even operatively connect the dusting arm directly to the automatic changing mechanism, rather than to the tone arm. Also, many different types of double pivot arrangements, for example jewel and pin or ball and socket joints, or other arrangements familiar to those skilled in the art will suggest themselves. Different types of dusting assemblies utilizing only one brush or employing other ways of ensuring that multiple brushes all effectively contact the record while compensating for unevenness or warpage will also be evident to those skilled in the art. Configurations of the cleaning mechanism whereby the dusting arm 14 does not lie substantially parallel to the tone arm 26, but lies substantially perpendicularly thereto or in other positions on the base of the record player will also be apparent. Other changes will, no doubt, readily suggest themselves to those skilled in the art. Hence, I desire that the foregoing be taken merely as illustrative and not in a limiting sense.

What is claimed is:

1. A dust removing mechanism for use with record players of the type having a tone arm, turntable, and changing mechanism for operating said tone arm through a cycle, said dust removing mechanism comprising in combination, (a) an auxiliary arm pivotally supported on said record player, (b) a dusting device attached to said auxiliary arm and adapted to remove dust from a record positioned on said turntable while said turntable is rotating, and (c) means operatively connecting said auxiliary arm to said tone arm and said changing mechanism during only those portions of said cycle when said tone arm is out of engagement with a record on said turntable and permitting disengagement of the tone arm and auxiliary arm when said tone arm engages the record.

2. A dust removing mechanism as defined in claim 1 where said means for operatively connecting said auxiliary arm to said tone arm comprise a protrusion on said tone arm which cooperates with said auxiliary arm, causing said auxiliary arm to substantially follow the movements of said tone arm during those portions of said cycle when said tone arm is out of engagement with a record on said turntable.

3. A dust removing mechanism as defined in claim 2 wherein said auxiliary arm includes positioning means for aligning said auxiliary arm with said tone arm when said tone arm is at the innermost portion of a record on said turntable.

4. A dust removing mechanism as defined in claim 1 where said means for operatively connecting said auxiliary arm to said tone arm and said changing mechanism comprise a protrusion on said auxiliary arm which cooperates with said tone arm causing said auxiliary arm to substantially follow the movements of said tone arm during those portions of said cycle when said tone arm is out of engagement with a record on said turntable.

5. A dust removing mechanism as defined in claim 1 wherein said means for operatively connecting said auxiliary arm to said tone arm and said changing mechanism comprise a protrusion on said tone arm which cooperates with a protrusion on said auxiliary arm causing said auxiliary arm to substantially follow the movements of said tone arm during those portions of said cycle when said tone arm is out of engagement with a record on said turntable.

References Cited by the Examiner

UNITED STATES PATENTS 1,435,645 11/22 Kidder et al. ----------- 274—47

NORTON ANSHER, *Primary Examiner.*